UNITED STATES PATENT OFFICE.

LEE O. FOX AND OSCAR A. FOX, OF LEWISTON, IDAHO.

COMPOSITION BUTTER.

1,014,457.     Specification of Letters Patent.     Patented Jan. 9, 1912.

No Drawing.     Application filed March 3, 1911. Serial No. 612,017.

*To all whom it may concern:*

Be it known that we, LEE O. Fox and OSCAR A. Fox, both citizens of the United States, and residents of Lewiston, in the county of Nez Perce and State of Idaho, have invented a new and useful Composition of Matter to be Used as Composition Butter, of which the following is a specification.

This invention consists of a new and useful composition of matter, the same forming as a new article of manufacture, an improved composition butter which is free from all deleterious chemicals and other similar substances; which possesses all of the flavor of ordinary butter and which is very similar to the same but can be made relatively much cheaper, and, at the same time, is highly preservative and healthful and can be used for all purposes for which the ordinary butter is used.

The composition consists of the following ingredients which are purely animal or vegetable, in or about the proportions stated, to wit:

Pure cocoanut butter, preference being had to the grade known as kaola _____ 75 per cent.
Cottolene _____ 12½ per cent.
Pure cow's butter _____ 6¼ per cent.
Dairy salt and butter coloring_ 6¼ per cent.

We do not, however, confine ourselves to the exact proportions of the ingredients herein named, as such proportions may be more or less varied without injury to the mass as a whole.

As the kaola is a relatively hard substance, the cottolene is added to soften it and to make it of the consistency of butter; the cow's butter is added to give it the flavor of ordinary butter.

Having thus described our invention, we claim as new and desire to secure by Letters Patent:

1. As a new article of manufacture, the herein-described butter, made up of cocoanut butter, cottolene, cow's butter, dairy salt and butter coloring, substantially as specified.

2. The herein described butter, comprising cocoanut butter, seventy-five per cent., cottolene, twelve and one-half per cent., cow's butter, six and one-half per cent., and dairy salt and butter coloring, six and one-half per cent.

3. The herein-described composition of matter, comprising cocoanut butter, cottolene, and cow's butter, substantially as specified.

In testimony whereof we have signed our names to this specification in the presence of two subscribing witnesses.

LEE O. FOX.
OSCAR A. FOX.

Witnesses:
RAY C. HYKE,
R. M. HAY.